United States Patent Office 3,156,291
Patented Nov. 10, 1964

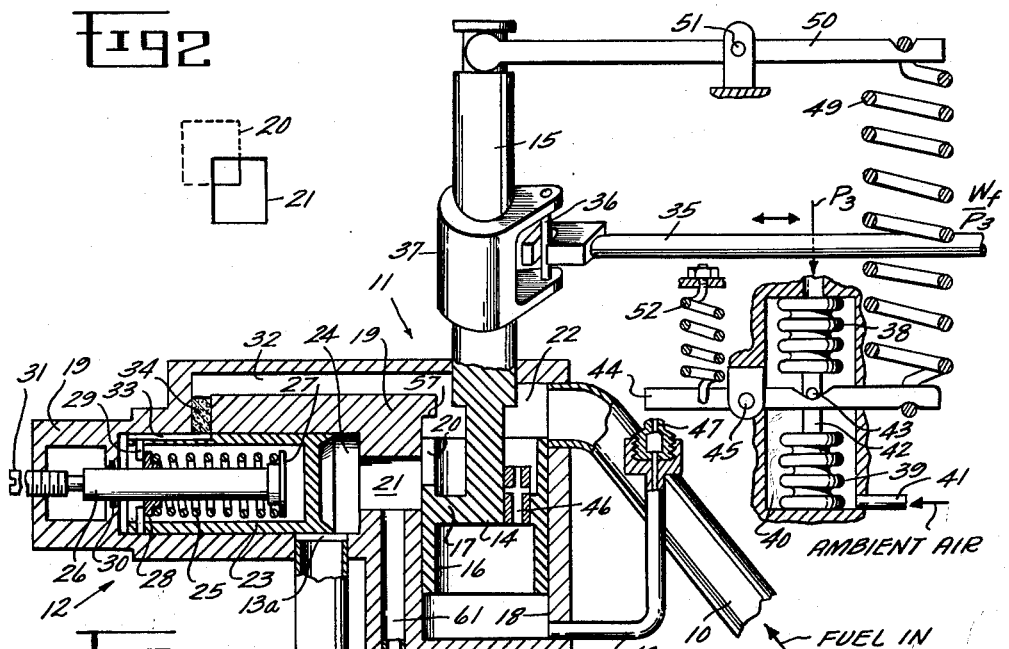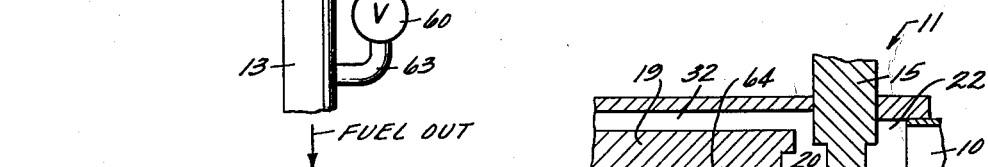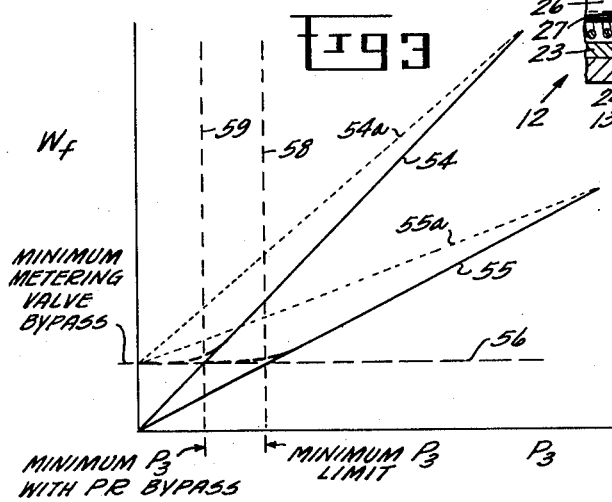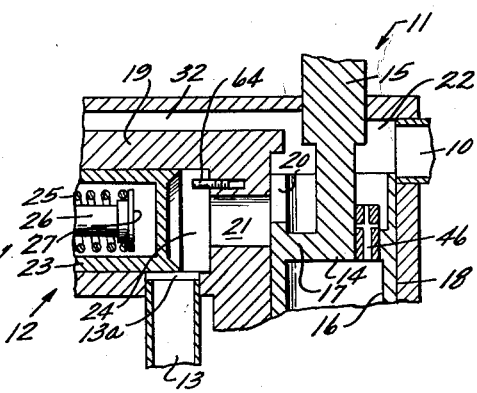

3,156,291
ENGINE FUEL CONTROL
Richard H. Cornell, Marblehead, Mass., assignor to General Electric Company, a corporation of New York
Filed Dec. 29, 1961, Ser. No. 163,330
6 Claims. (Cl. 158—36.4)

My invention relates to fuel control systems for gas turbine engines and in particular to an improved system for providing a preselected minimum fuel flow schedule.

In certain types of engine fuel control systems, particularly in the case of afterburner fuel controls, it is necessary to provide a minimum fuel flow schedule which specifies a minimum fuel flow rate for the system under all conditions of operation. In the case of afterburner fuel systems, this requirement is typically generated by the type of fuel pumping and control system employed, which usually involves a centrifugal or similar type pump, the output flow rate of which is controlled by throttling.

In this type of system, when a reduction in fuel flow rate is desired, the amount of throttling on the pump output is increased, thereby causing a greater proportion of the pumping energy to go into heat and at the same time reducing the flow rate of the fuel which absorbs this heat. As the lower fuel flow rates are scheduled by increased throttling, the pump operating temperature will increase and at very low flows the pump temperature will begin to rise very rapidly causing the pump to approach a failure condition. In order to avoid the overheating problem, it is necessary to impose a minimum fuel flow requirement on the system which is capable of absorbing the throttling losses without an excessive rise in temperature.

Now in systems of this kind, it is common to schedule fuel flow by adjusting the flow area of a metering valve across which a constant pressure is maintained. The flow through the metering valve is thus made substantially directly proportional to the valve flow area. Constant pressure across the metering valve may be maintained in several ways such as, for example, by adjusting the flow area of a pressure regulating valve in series flow relationship with the metering valve.

In one application of such a system to an afterburner fuel control with which I am familiar, the area of the metering valve is controlled by two inputs to the valve, one being a rotational position and the other being a longitudinal position of the valve stem. Two area controlling ports in the valve are overlapped in such a fashion that the flow area is established as the product of the two inputs to the valve or, in other words, such that the flow area is proportional to the product of the rotational movement multiplied by the longitudinal movement of the valve. In this particular application, one of the signals is made proportional to the scheduled fuel flow rate divided by the compressor discharge pressure, a parameter commonly referred to as $W_f/P_3$, and the other signal is made proportional to $P_3$, such that the product of these two signals, which schedules the fuel flow area, is thus made directly proportional to the called for fuel flow rate.

The problem comes in trying to provide a minimum fuel flow limit in this kind of environment. The metering valve has two inputs, one being the $W_f/P_3$ input, and the other being the $P_3$ input, each of which is capable of varying the flow area of the metering valve. Therefore, an approach which would call for limiting the flow area of the metering valve to some preselected minimum level would involve a two dimensional limit problem. Assuming a system with maximum and minimum $W_f/P_3$ stops, a minimum $P_3$ stop would, in fact, provide a minimum fuel flow limit on the system.

The minimum $P_3$ stop would have to be set, however, such that at minimum $W_f/P_3$, the resulting fuel flow would not be less than the specified minimum level. This means, however, that the system is incapable of responding to actual values of $P_3$ less than that represented by the stop limit, even though at higher $W_f/W_3$ settings fuel flow rates greater than the minimum would otherwise have been scheduled at the lower actual $P_3$ values. To give an example, consider a system having a maximum $W_f/P_3$ setting of ten units and a minimum $W_f/P_3$ setting of two units. Assume that the minimum fuel flow limit is to be two units of $W_f$. The minimum $P_3$ stop must be selected at one unit of $P_3$ to provide a fuel flow of at least two units at the minimum $W_f/P_3$ setting of two units. The system is thus made insensitive to $P_3$ values less than one unit even though $P_3$ values down to 0.2 units would otherwise be permitted at the maximum $W_f/P_3$ setting of ten units while still providing at least two units of fuel flow. Because the $P_3$ stop thus has to be selected to provide at least the minimum fuel flow at the minimum $W_f/P_3$ setting, a portion of the operating range of the system which would otherwise be available at the higher $W_f/P_3$ settings is lost.

Rather than attempting to place a limit on the minimum flow area of the metering valve itself, it has also been suggested that the metering valve be provided with a fixed area bypass, the area of which is selected to provide the minimum required fuel flow. The fixed area metering valve bypass, however, adds an increment of area to all metering valve settings and gives the valve a non-zero intercept in the relationship between fuel flow and $P_3$ for any given $W_f/P_3$ setting. What this means is that because of the fixed area in parallel with the metering valve, the total area which establishes the flow rate is no longer exactly directly proportional to the product of the two inputs to the metering valve because only the area of the metering valve itself is determined by this product and not the area of the bypass. This error becomes more pronounced at the smaller metering valve areas because in this region the bypass area represents a greater proportion of the total area.

In view of the foregoing, it is accordingly an object of my invention to provide a minimum fuel flow schedule system for a gas turbine engine control of the foregoing general type in which a true minimum fuel flow schedule is established without affecting the ability of the control to perform over the remainder of its operating range.

I accomplish this and other objects and advantages of my invention in one embodiment thereof by providing first of all a $P_3$ stop on the metering valve representing a $P_3$ level at or below the desired minimum flow level at the maximum $W_f/P_3$ setting. It will be appreciated, of course, that the provision of such a $P_3$ stop would normally allow flows lower than the desired minimum at $W_f/P_3$ settings less than the maximum setting. In combination with this I provide in one embodiment a fixed area bypass around the pressure regulating valve which is in series with the metering valve. The operating flow area ranges of the pressure regulating valve and the bypass around the pressure regulating valve are selected such that under minimum flow conditions the pressure regulator bypass area becomes the flow determining area of the system. This is done by making the operating pressure drop across the pressure regulator valve very much larger than the drop across the metering valve, or in other words, making the operating area range of the pressure regulating valve much smaller than the operating area range of the metering valve.

This means that once the minimum flow condition is reached, as determined by the area of the pressure regulator bypass, further reductions in the area of the metering valve, up to a point, have almost negligible effect in reducing the flow rate. This allows the minimum $P_3$ stop to be selected at a low enough level to permit operation over the full range of conditions while still retaining the minimum flow schedule.

My invention will be better understood and various other objects and advantages thereof will become apparent from the following description taken in connection with the accompanying drawings in which:

FIG. 1 is a schematic of a portion of an afterburner fuel control embodying my invention;

FIG. 2 is a cross-sectional view of the porting relationships of the metering valve shown in FIG. 1, illustrating the shapes and overlapping relationships of the flow control ports;

FIG. 3 is a graphical presentation of fuel flow versus compressor discharge pressure characteristics showing the minimum fuel flow schedules of several types of controls including the embodiment of FIG. 1; and FIG. 4 is a fragmentary view of a portion of the system of FIG. 1 modified to incorporate an alternative embodiment of my invention.

Referring now to FIG. 1, I show a schematic of a portion of an afterburner fuel control for a jet engine. In operation fuel is supplied to the system from an engine driven centrifugal or similar type pump, not shown, through a supply conduit 10. The fuel flows into a metering valve 11, a pressure regulating valve 12 and then out to the afterburner system through a discharge conduit 13. The flow of fuel from the pump is controlled by the throttling action of the metering valve and the pressure regulating valve in a manner later to be explained.

The metering valve 11 comprises a piston portion 14 having secured thereto a stem 15 through which control of the valve is exercised. The piston portion 14 of the valve is formed of a cylindrical member 16 and a web 17 which is secured to the stem 15. The cylindrical member 16 is mounted for rotational and longitudinal movement in a cylinder 18 which is formed in the valve casing 19.

Formed in the upper portion of the cylindrical member 16 is a slotted port 20, which in operation cooperates with and overlaps a portion of a port 21 formed in the valve casing 19 and extending through the wall of the cylinder 18. FIG. 2 shows a view of the shapes of the ports 20 and 21 looking into the port 21 in the right hand direction as shown in FIG. 1 and for a particular position of the metering valve piston. In operation, fuel flows from the inlet conduit 10 into an upper chamber 22 in the metering valve and from there through the area formed by the overlap of the ports 20 and 21 into the port 21.

The port 21 discharges into the pressure regulating valve 12 which comprises a piston 23 slidably mounted in a cylinder 24 and spring loaded in the left hand direction by means of a spring 25. The spring 25 is mounted on a shaft 26 and engages at one end a washer 27 which is secured to the shaft 26 and engages at the opposite end a washer 28 which is slidable on the shaft and which engages a snap ring 29 mounted in the piston 23. The shaft 26 is secured against longitudinal movement in the casing 19 by an adjustment screw 31, which is formed as a part of the shaft 26 and which permits adjustment of the spring force. The shaft 26 is sealed in the casing 19 by means of an O ring 30.

Formed in the valve casing 19 and extending into the cylinder 24 of the pressure regulating valve is a discharge port 13a which communicates with the discharge conduit 13 of the control system. The exposed flow area of the port 13a is determined by the amount of overlap of the piston 23 with the port 13a. It will thus be seen that the fuel flow from the inlet conduit 10 to the discharge conduit 13 must pass through two area controlling passages, the first being formed by the overlap of the ports 20 and 21 in the metering valve 11 and the second by the overlap of the piston 23 with the port 13a in the pressure regulating valve 12.

The function of the pressure regulating valve 12 in controlling the exposed flow area of the port 13a is to maintain a substantially constant pressure drop across the metering valve 11, that is from the inlet chamber 22 to the discharge port 21.

The pressure on the upstream side of the metering valve, that is the pressure in the chamber 22, is applied to the left hand side of the pressure regulating valve piston 23 through passages 32 and 33, the passage 32 having a filter 34 therein to prevent dirt particles and other impurities from affecting the operation of the piston 23. The pressure on the downstream side of the metering valve, that is the pressure in the discharge port 21, is applied to the right hand side of the pressure regulating valve piston 23 by reason of the connection of the port 21 to the cylinder 24.

Because in operation the pressure on the downstream side of the metering valve 11 will always be less than the pressure on the upstream side, the resulting pressure difference across the pressure regulating valve piston 23 will be in a direction to force the valve to the right or, in other words, in a direction opposing the force exerted on the piston by the spring 25. The piston 23 will thus seek an equilibrium position at which the pressure difference force balances the spring force.

Now it will be observed that for any given metering valve flow area, represented by a particular overlap of the ports 20 and 21, movement of the piston 23 to change the exposed flow area of the port 13a will produce an adjustment in the flow and consequently a change in the pressure drop across the metering valve. In other words, because the metering valve and the pressure regulating valve are series connected throttling orifices which control the fuel flow rate of the fuel pump, a change in the flow area of either device produces a change in the pressure drop across the other. Thus if, for a given set of conditions, the flow area of the pressure regulating valve is increased by moving the piston 23 to the left, the flow rate will be caused to increase, thereby increasing the pressure drop across the metering valve. Similarly, a decrease in the flow area of the pressure regulating valve causes a decrease in the pressure drop across the metering valve.

The gradient of the spring 25 is relatively flat in the range of operation, and for purposes of explanation will be assumed to exert a constant force on the piston 23 in the left hand direction. The primary change in the force level on the piston 23 then comes from the adjustment of the pressure drop across the metering valve 11. The greater the pressure drop, the greater the force on the piston and vice versa. The piston 23 will thus move to a force equilibrium position at which the force exerted on the piston by the pressure difference across the metering valve exactly balances the force exerted by the spring 25. Assuming as I have mentioned above that the spring gradient is relatively flat, a constant pressure drop is thus maintained across the metering valve 11 from the inlet chamber 22 to the discharge port 21, the magnitude of which is determined by the force exerted by the spring 25, which is in turn adjustable by means of the screw 31.

The fuel flow rate through the metering valve is thus made substantially directly proportional to the flow area of the metering valve as established by the overlap of the ports 20 and 21. The amount of overlap of the ports 20 and 21 is controllable in two dimensions, one being the rotational position of the cylindrical piston portion 16 and the other being its longitudinal position, which are established respectively by the rotational and longitudinal positions of the valve stem 15.

In the system illustrated, the $W_f/P_3$ parameter is introduced as the rotational position of the metering valve. It will be recalled that this parameter is computed desired fuel weight flow $W_f$ divided by the compressor discharge pressure $P_3$. This signal is introduced by means of an arm 35 which engages a post 36 on a collar 37 which is attached to the valve stem 15. The rotational position of the metering valve stem 15 is thus determined by the longitudinal to the $W_f/P_3$ parameter.

The longitudinal position, on the other hand, of the valve stem 15 is determined by the magnitude of the compressor discharge pressure signal $P_3$. The $P_3$ signal is converted into mechanical form by two opposing bellows 38 and 39, the upper one 38 being connected to compressor discharge pressure and the lower one, 39, being evacuated. The bellows 38 and 39 are positioned in a chamber 40 which is exposed to ambient pressure through a conduit 41. The bellows 38 and 39 are interconnected by a rod 42 which has secured to it a laterally extending pin 43. Because the effects of ambient pressure force on the bellows 38 are balanced out by the equal and opposite force exerted on the bellows 39, the net force generated by the two bellows is thus made proportional to the absolute level of compressor discharge pressure $P_3$.

This force is imposed by the pin 43 on an output link 44 which is pivotally mounted at 45. The link 44 forms the flapper portion of an orifice-flapper arrangement which includes orifices 46 and 47 connected in series flow relationship by a conduit 48 as shown and to the fuel supply pressure in the metering valve in chamber 22. The pressure on the upper side of the metering valve piston 14 is thus determined by the supply pressure and the pressure on the lower side is determined by the pressure drop across the orifice 46, which is in turn controlled by the proximity of the flapper 44 to the orifice 47.

The operation of flapper type valves is well known in the art and the arrangement comprising the flapper 44 and the series connected orifices 46 and 47 will therefore not be further explained except to state that the position of the flapper 44 controls the pressure drop across the orifice 46 and hence the pressure difference across the metering valve piston 14. Movement of the flapper valve 44 further away from the orifice 47 increases the pressure drop across the orifice 46 and hence increases the downward force exerted on the piston 14 while movement of the flapper 44 closer to the orifice 47 decreases the downward force on the piston 14.

The flapper link 44 is connected at its opposite end to a feedback spring 49 which in turn engages one end of a feedback link 50, which is pivotally mounted at 51 and which at its opposite end engages the stem 15 of the metering valve. Also secured to the flapper link 44 is a reference spring 52 which exerts an opposite moment on the link 44 and which, together with the feedback spring 49, establishes a force gradient against which the bellows force proportional to $P_3$ is applied.

The system operates in the following manner to position the metering valve piston 14 in a longitudinal direction as a function of $P_3$.

Assume an equilibrium condition with a fixed $W_f/P_3$ input establishing a fixed rotational position of the valve stem 15. Assume further an increase in $P_3$ which increases the downward force exerted on the flapper 44 by the pin 43 and causes the flapper to move away from the orifice 47.

Movement of the flapper 44 away from the orifice 47 causes an increase in the pressure drop across the orifice 46 and hence an increase in the downward force on the piston 14. As the metering valve piston moves downward, the link 50 is caused to pivot to increase the force exerted by the spring 49 on the flapper 44, in a direction to balance the force caused by the $P_3$ increase until it moves the flapper 44 back to its starting position. At some point the system will thus reach a new equilibrium position with the piston 14 moved downward by an amount proportional to the increase in the $P_3$ signal.

Now, as I have pointed out above, the metering valve flow area, which is determined by the overlap of the ports 20 and 21, is a function of both the angular and longitudinal positions of the metering valve piston 14. In other words, for any given $P_3$, the valve can be rotated in response to the $W_f/P_3$ input to increase or decrease the flow area, and for any given $W_f/P_3$, the valve can be moved longitudinally in response to the $P_3$ input to increase or decrease the area. The total flow area of the metering valve 11 is thus proportional to the product of $W_f/P_3$ and $P_3$ or, in other words, proportional to the desired fuel flow rate $W_f$.

The resulting characteristic of fuel weight flow $W_f$ versus compressor discharge pressure $P_3$ for constant $W_f/P_3$ is shown in FIG. 3 by the solid lines 54 and 55, the line 54 representing the maximum $W_f/P_3$ signal and the line 55 representing the minimum $W_f/P_3$ signal. In other words, the line 54 represents the $W_f$ versus $P_3$ characteristic for a fixed rotational position of the metering valve corresponding to the maximum $W_f/P_3$ signal, the variation in $W_f$ as a function of $P_3$ then being determined by the longitudinal movement of the metering valve. The line 55 shows the same kind of characteristic except for the minimum $W_f/P_3$ signal. The total characteristic of the system is represented by the whole family of slopes falling between the lines 54 and 55.

I will now use the characteristics shown in FIG. 3 to discuss several approaches to the minimum fuel flow schedule problem in order to demonstrate the principles involved. Assume first of all that the minimum fuel flow rate permissible is represented by the dotted line 56. Assume further that the approach selected is to limit the minimum value of metering valve flow area by using a minimum $P_3$ stop. The $P_3$ stop may be accomplished by means of a housing stop 57 as I have illustrated in FIG. 1 which engages the metering valve piston 14, although this stop is set at a different value than is the case with the example now under consideration.

At any rate, with the approach under consideration, the minimum $P_3$ limit must be selected such that at the minimum $W_f/P_3$ setting, represented by the line 55, the scheduled fuel flow rate will not fall below that represented by the line 56. On this basis, the lowest value of the $P_3$ limit that can be selected is represented by the dotted line 58. This means that all actual values of $P_3$ less than that represented by the line 58 will still result in the introduction of the minimum $P_3$ signal represented by the line 58, even though the actual $P_3$ level is less than that.

It will be observed, however, that the minimum $P_3$ limit represented by the line 58 is higher than necessary for the higher $W_f/P_3$ signals. For example, at the maximum $W_f/P_3$ signal represented by the line 54, the minimum fuel flow requirements can be met with a minimum $P_3$ as low as that represented by the line 59. With the $P_3$ stop set this low, however, flows less than the required minimum would occur at $W_f/P_3$ settings less than that represented by the line 54. With the approach under discussion, then, the stop must be selected to correspond to the line 58 with the result that the system is insensitive to $P_3$ over the range between the lines 58 and 59 and above the line 56, a range where satisfactory operation could otherwise be obtained.

Consider now an alternative approach in which a fixed area bypass is used around the metering valve, the bypass area being selected to supply the minimum flow rate represented by the line 56 with zero flow area of the metering valve itself. This approach produces the characteristics represented by the lines 54a and 55a in which the zero intercept is moved up to the level of the line 56. The error introduced by this approach, particularly at the lower $P_3$ range at which the metering valve area begins to approach that of the bypass, is obvious from the illustration of FIG. 3.

With this background, I will now explain the approach which I follow in the embodiment of my invention shown in FIG. 1. In this embodiment, I provide a $P_3$ stop 57 set at a minimum $P_3$ signal level corresponding to the line 59 in FIG. 3. As I have mentioned above, this approach, taken by itself, will allow flows less than the required minimum at $W_f/P_3$ settings less than the maximum represented by the line 54. In combination with this, then, I provide a fixed area bypass valve 60 around the pressure regulating valve 12. The bypass valve 60 is connected to the metering valve discharge port 21 by means of an internal passage 61 and a conduit 62 and to the discharge conduit 13 of the pressure regulating valve 12 by means of a conduit 63.

Now in the typical case, the pressure drop across the pressure regulating valve is substantially greater than the drop across the metering valve. To give an example, in one application with which I am familiar, the pressure drop held across the metering valve is about 60 p.s.i. whereas the operating range of pressure drops across the pressure regulating valve is in the order of 650–700 p.s.i. In other words, in the operating range, the flow area of the pressure regulating valve 12 is selected as substantially smaller than the flow area range of the metering valve. I maintain that relationship here.

With the foregoing in mind, consider now the operation of the embodiment of FIG. 1 with the $P_3$ stop 57 set to provide a $P_3$ limit as shown at 59 in FIG. 3 and with the fixed area bypass 60 across the pressure regulating valve 12. For purposes of explanation, assume a minimum $W_f/P_3$ setting as represented by the line 55. Assume further that $P_3$ is being reduced with $W_f$ approaching the minimum flow line 56. Except for the bypass 60, $W_f$ would normally continue to decrease below the level of 56 along the line 55.

In the vicinity of the intersection of the line 55 with the minimum fuel flow line 56, however, the pressure regulating valve is made to begin to lose its ability to control the pressure drop across the metering valve because the operating area of the pressure regulating valve begins to approach that of the bypass. At the intersection of line 55 with the minimum fuel flow line 56, the pressure regulator is fully closed and bypass 60 establishes the minimum flow rate 56.

Because the area of the bypass 60 is substantially less than the flow area of the metering valve in this region of operation, the area of bypass 60 determines the flow rate and further decreases in the area of the metering valve have almost negligible effect on the flow rate in this region. It will be apparent, of course, that as the metering valve area continues to decrease, eventually that area will become smaller than the area of the bypass 60 and the metering valve area will then become dominant in controlling the flow rate. The minimum $P_3$ stop is set, however, at a level such that the metering valve area will not go down into this range. The stop 57 is set at the $P_3$ level represented by the line 59 which allows the full use of the operating map above the minimum fuel flow line 56. Actually, the stop can be set at a lower level of $P_3$ without getting into the sensitive range, or it may be set at a higher level in the event it is not considered necessary to operate the control over some portion of the available range.

The point is, however, that my invention permits a $P_3$ stop setting at a lower level than that represented by the line 58, thus permitting operation over a wider range of the available map.

It will be appreciated by those skilled in the art that the minimum $W_f$ line 56 which runs from the $P_3$ stop line 59 to the intersections with the constant $W_f/P_3$ lines actually has a very small upward slope blending into each of the constant $W_f/P_3$ lines. In other words, variations in metering valve flow area produced by changes in $P_3$ in this region actually produce a very small effect on the fuel flow rate $W_f$. Because of the large difference in area, however, between the metering valve and the bypass 60, this effect is virtually negligible. Once the $P_3$ stop is engaged at the line 59, the minimum fuel flow line is then essentially flat back to zero actual $P_3$ because no further area variations take place.

In FIG. 4, I show an alternative embodiment of my invention in which a pressure regulating valve minimum area stop 64 is used instead of a bypass around the pressure regulating valve. This provides essentially the same characteristic as that produced by the embodiment of FIG. 1 in that a fixed minimum pressure regulating valve area is provided as the lower $P_3$ values are approached. The stop 64 may be threaded into the casing 19 as shown to permit adjustment to any desired area setting. At some preselected flow area of the pressure regulating valve, corresponding to that required for accommodating the minimum fuel flow rate, the stop 64 engages the piston 23 to fix the minimum area of the valve. As in the case of the embodiment of FIG. 1, this area is much less than the area of the metering valve in this range of operation such that over this range and down to the minimum $P_3$ stop, the minimum fuel flow rate is established by the area fixed by the stop 64, with changes in the area of the metering valve 11 producing only a negligible effect.

It will be appreciated, of course, that various other bypass and minimum area stop arrangements may be used on or with the pressure regulating valve to achieve the results which I have described. The significant point is that at the lower $P_3$ values approaching the minimum fuel flow limit, the pressure regulating system is caused to saturate at a fixed flow area connected in series with the metering valve, this series connected flow area then substantially determining the minimum fuel flow for further decreases in $P_3$ down to the $P_3$ stop limit, thereby permitting a $P_3$ stop at a lower level than would otherwise be permissible.

Various other applications of my invention will occur to those skilled in the art and it should thus be understood that various modifications, changes and substitutions may be made in the embodiments set forth without departing from the true scope and spirit of my invention as I have defined it in the appended claims.

What I claim as new and desire to secure by Letters Patent of the United States is:

1. A gas turbine engine fuel control system comprising a fuel pump, a metering valve connected in series flow relationship with said fuel pump for controlling the output flow rate thereof, a pressure regulating valve connected in series flow relationship with said metering valve for maintaining a substantially constant pressure drop across said metering valve; and means for establishing a minimum fuel flow schedule comprising:
    (a) minimum flow area limiting means establishing a preselected minimum flow area in series with said metering valve, and
    (b) means establishing a variable preselected minimum flow area of said metering valve,
    (c) the minimum flow area established by said minimum flow area limiting means being less than the minimum flow area of said metering valve.

2. A gas turbine engine fuel control system comprising:
    (a) fuel pumping means,
    (b) a metering valve connected in series flow relationship with said fuel pumping means for controlling the output flow rate thereof and including means for limiting the flow area of said metering valve to a variable preselected minimum area,
    (c) a pressure regulating valve connected in series flow relationship with said metering valve for maintaining a substantially constant pressure drop across said metering valve, and
    (d) a fluid flow bypass connected in parallel with said pressure regulating valve for establishing a minimum fuel flow rate for the system.

3. A gas turbine engine fuel control system comprising:
    (a) fuel pumping means, (b) a metering valve connected in series flow relationship with said fuel pumping means for controlling the output flow rate thereof and including means for limiting the flow area of said metering valve to a variable preselected minimum area,
(c) a pressure regulating valve connected in series flow relationship with said metering valve for maintaining a substantially constant pressure drop across said metering valve, and
(d) means for limiting the flow area of said pressure regulating valve to a preselected minimum level, thereby establishing a minimum fuel flow rate for the system.

4. A fuel control system for a gas turbine engine comprising a fuel pump, a metering valve connected in series flow relationship with the fuel pump for controlling the output flow rate thereof, a pressure regulating valve connected in series flow relationship with said metering valve for maintaining a substantially constant pressure drop across said metering valve; and means establishing a minimum fuel flow schedule comprising:
(a) a fluid flow bypass connected in parallel with said pressure regulating valve, and
(b) stop means associated with said metering valve and establishing a variable minimum flow area thereof,
(c) the flow area of said fluid flow bypass being less than the minimum flow area of said metering valve as established by said stop means.

5. A fuel control system for a gas turbine engine comprising a fuel pump, a metering valve connected in series with the fuel pump for controlling the output flow rate thereof, a pressure regulating valve connected in series flow relationship with said metering valve for maintaining a substantially constant pressure drop across said metering valve; and means establishing a minimum fuel flow schedule comprising:
(a) first stop means associated with said metering valve and establishing a variable minimum flow area thereof, and
(b) second stop means associated with said pressure regulating valve and establishing a minimum flow area thereof.
(c) the minimum flow area of said pressure regulating valve as established by said second stop means being less than the minimum flow area of said metering valve as established by said first stop means.

6. A gas turbine engine fuel control system comprising:
(a) a fuel pump,
(b) a metering valve connected to control the flow rate of fuel from said fuel pump to a combustion system,
(c) variable flow area pressure regulating means connected in series flow relation with said metering valve for maintaining the pressure drop across said metering valve substantially constant, and
(d) means for saturating the pressure regulating characteristic of said pressure regulating means at a preselected minimum fuel flow rate corresponding to a variable preselected minimum flow area of said metering valve,
(e) the flow area of said pressure regulating means in its saturated condition being less than said preselected minimum metering valve flow area.

References Cited in the file of this patent
UNITED STATES PATENTS

| | | |
|---|---|---|
| 2,845,087 | Thomas | July 29, 1958 |
| 2,879,643 | Stroh et al. | Mar. 31, 1959 |
| 2,950,733 | Perkins | Aug. 30, 1960 |
| 3,106,934 | Rogers et al. | Oct. 15, 1963 |